J. HUTCHINGS.
INTERNAL COMBUSTION ENGINE.
APPLICATION FILED JAN. 23, 1907.

904,961.

Patented Nov. 24, 1908.
7 SHEETS—SHEET 1.

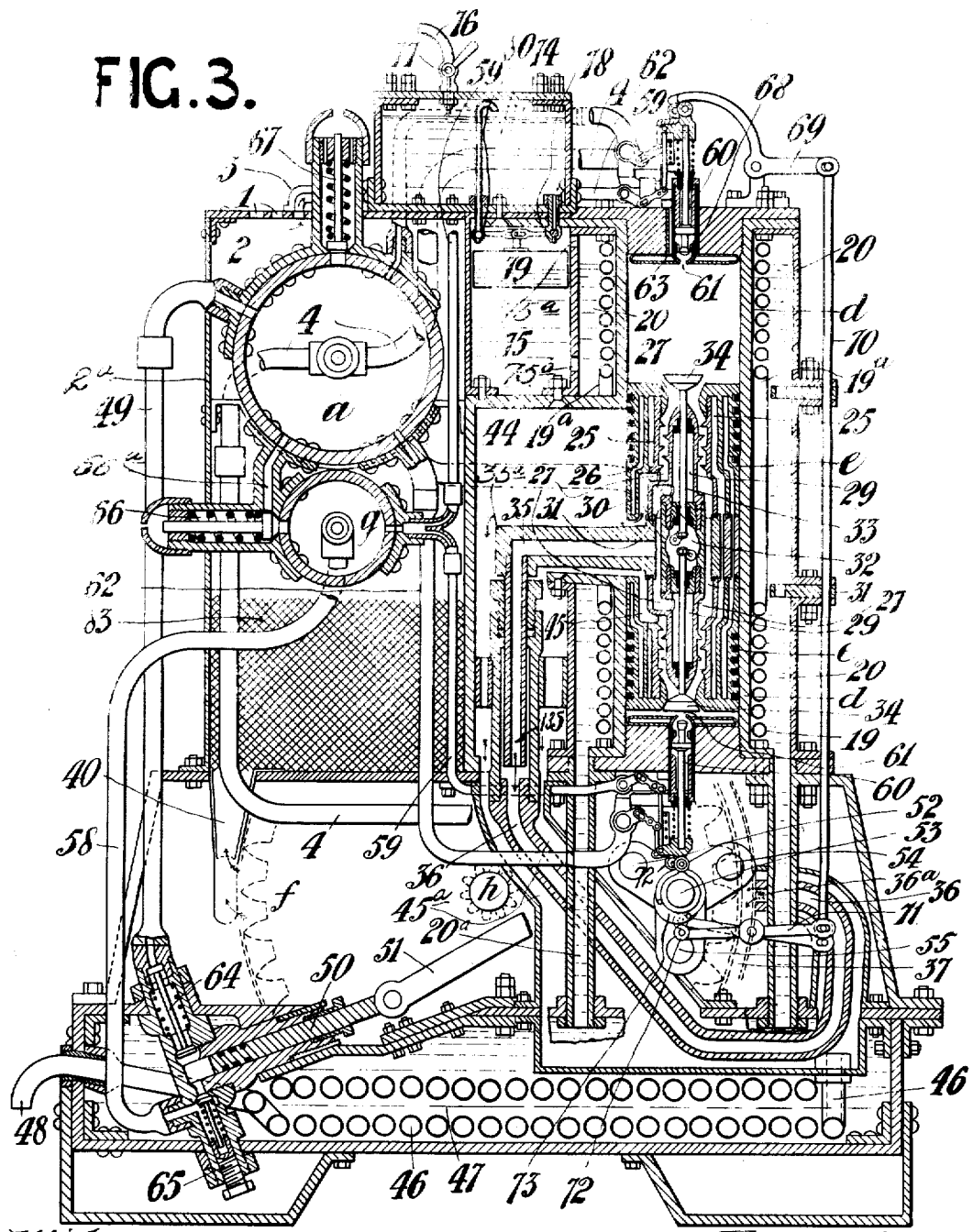

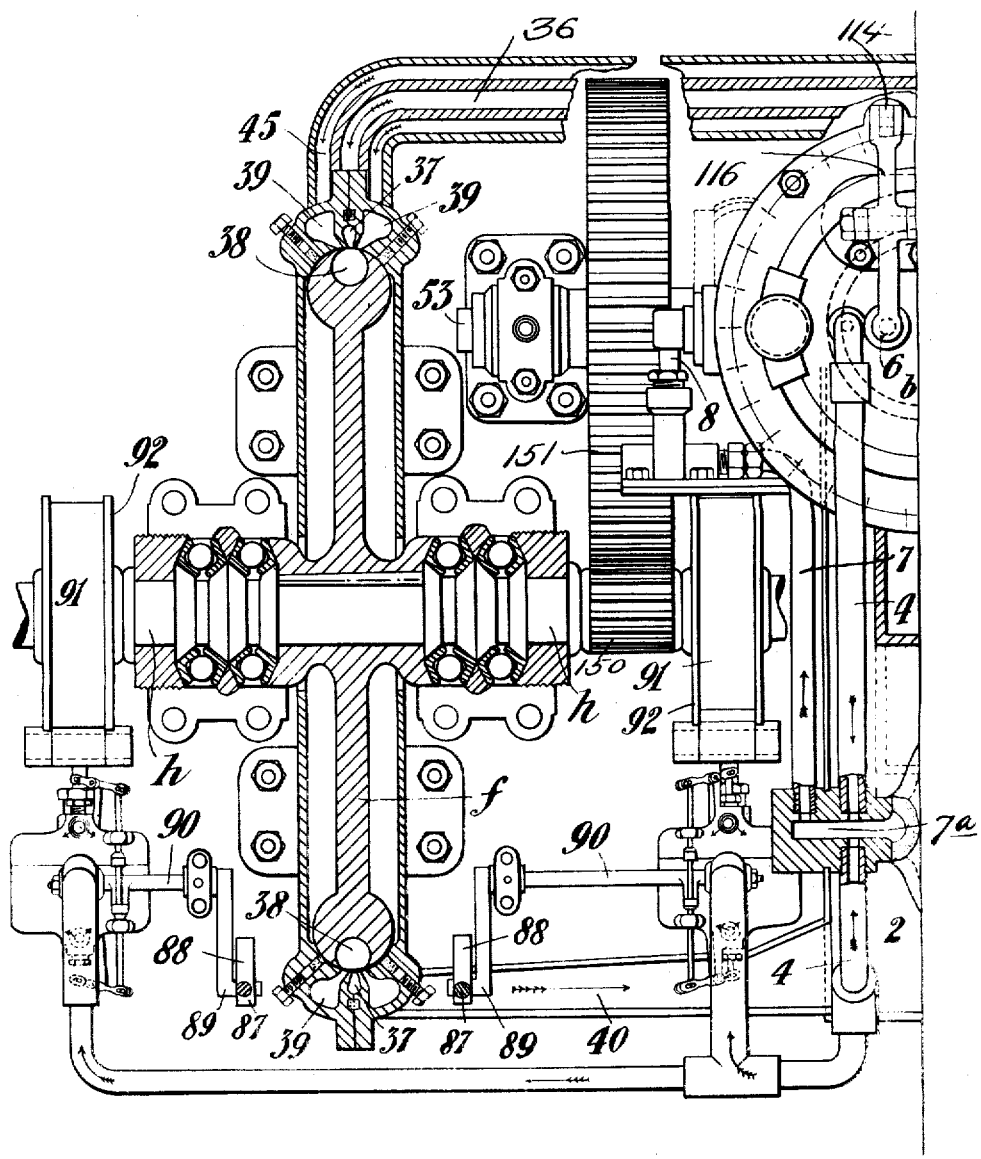

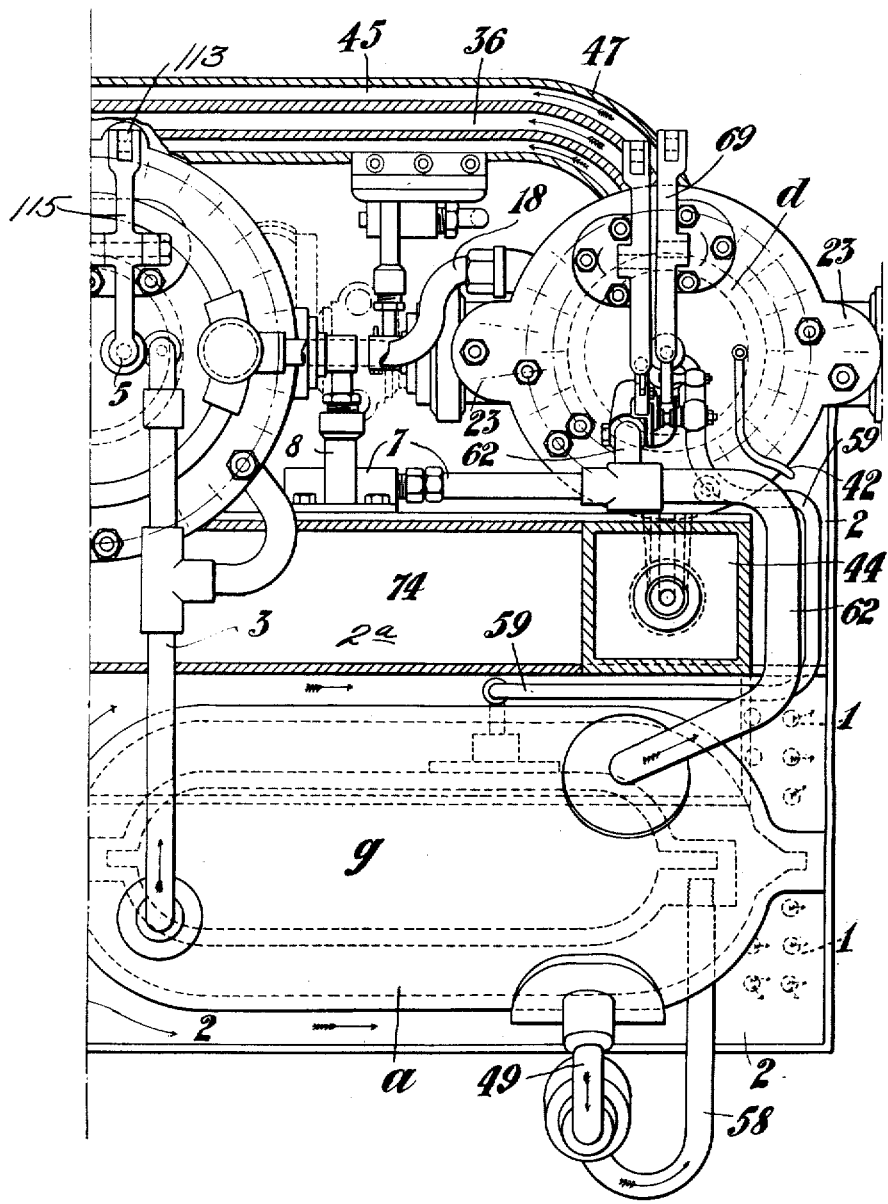

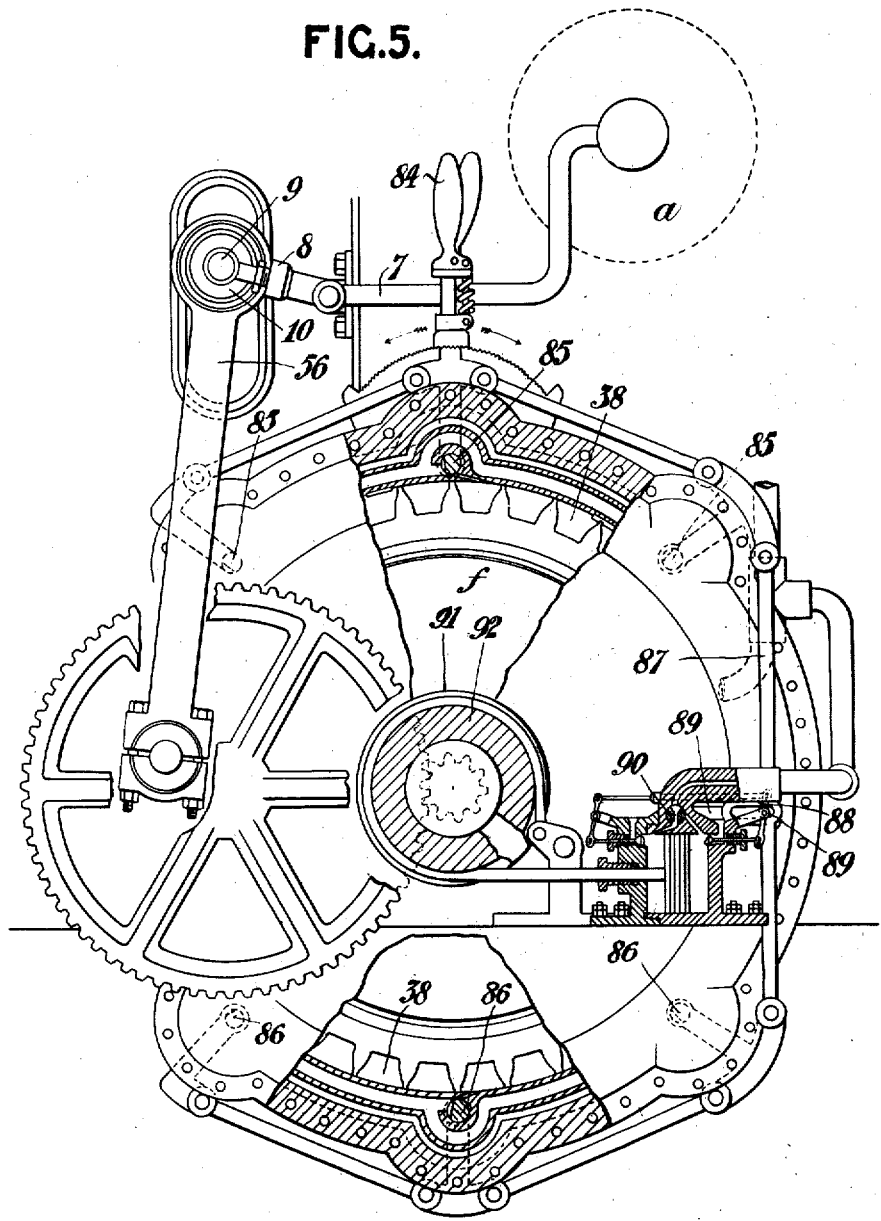

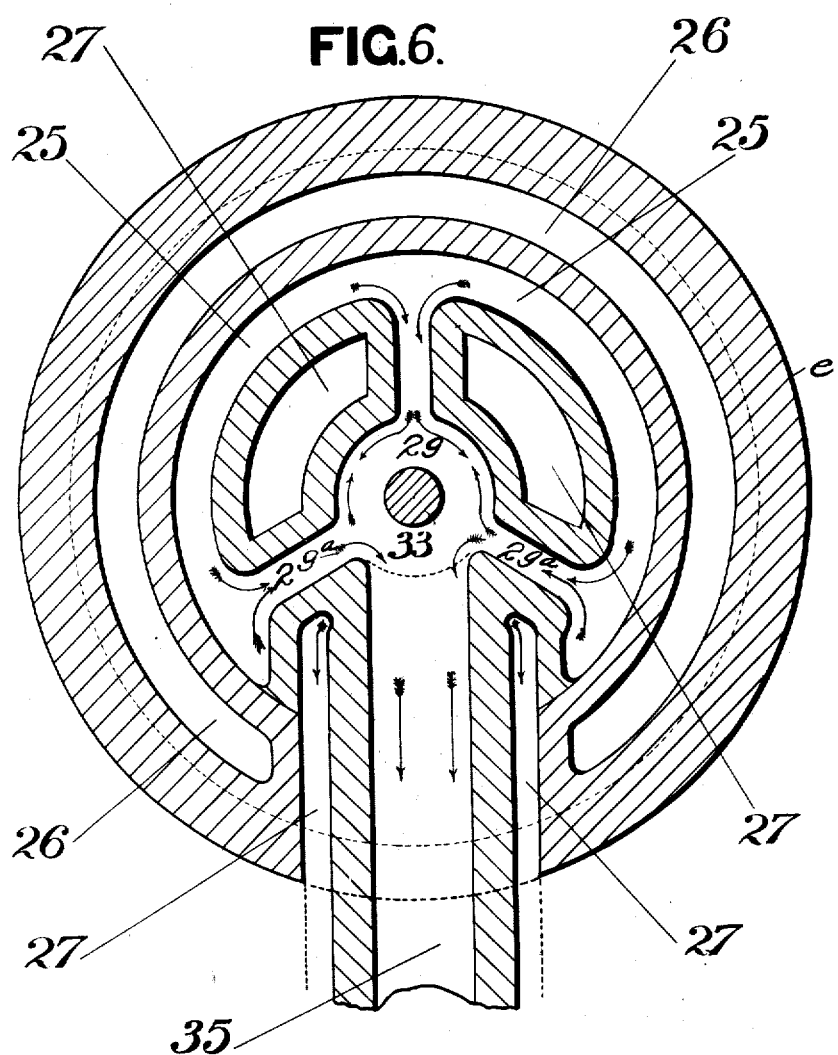

UNITED STATES PATENT OFFICE.

JOHN HUTCHINGS, OF LONDON, ENGLAND.

INTERNAL-COMBUSTION ENGINE.

No. 904,961.  Specification of Letters Patent.  Patented Nov. 24, 1908.

Application filed January 23, 1907. Serial No. 353,642.

*To all whom it may concern:*

Be it known that I, JOHN HUTCHINGS, a subject of the King of Great Britain, residing at 210 Moorgate Station Chambers, Moorfields, in the city of London, England, mechanical and mining engineer, have invented certain new and useful Improvements in and Relating to Internal-Combustion Engines, of which the following is a specification.

My present invention relates to improvements in engines of the character described in my prior application Serial No. 353,485, filed Jan. 22, 1907, and it has for its object to provide an engine embodying a primary motor which is preferably of the internal combustion type, an auxiliary motor which is preferably connected thereto, and means for conducting the motive fluid for the secondary motor through heat absorbing chambers in the primary motor, whereby the cylinder, piston and other operating parts of the latter are cooled, and the heat thus abstracted is utilized to increase the volume and pressure of the fluid supplied to the secondary motor, so that the primary motor is effectually cooled, and the heat that is ordinarily wasted is transformed into mechanical energy.

To these and other ends, the invention consists in certain improvements, and combinations and arrangements of parts, all as will be hereinafter more fully described, the novel features being pointed out particularly in the claims at the end of the specification.

Figure 1:
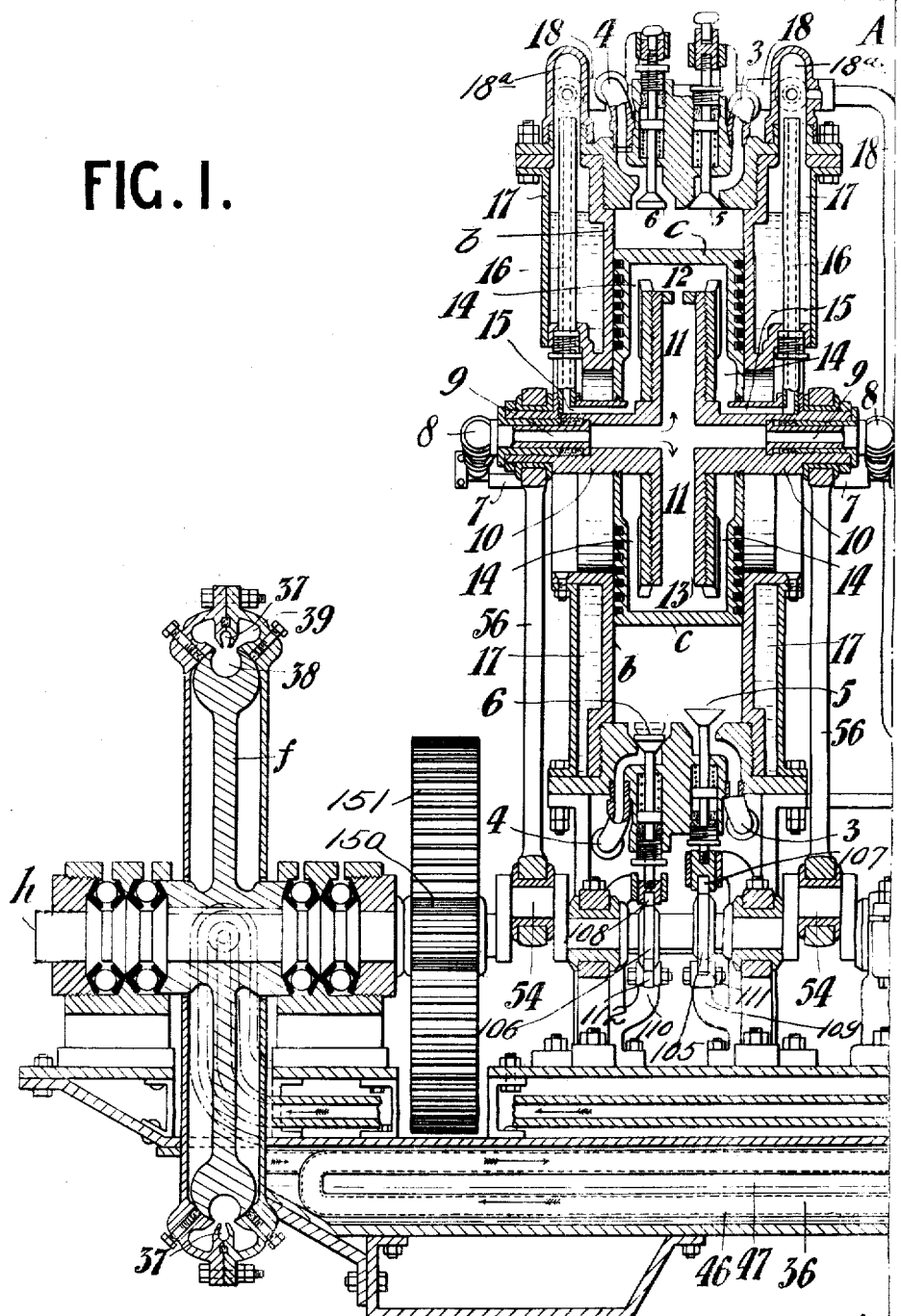
Figure 2:
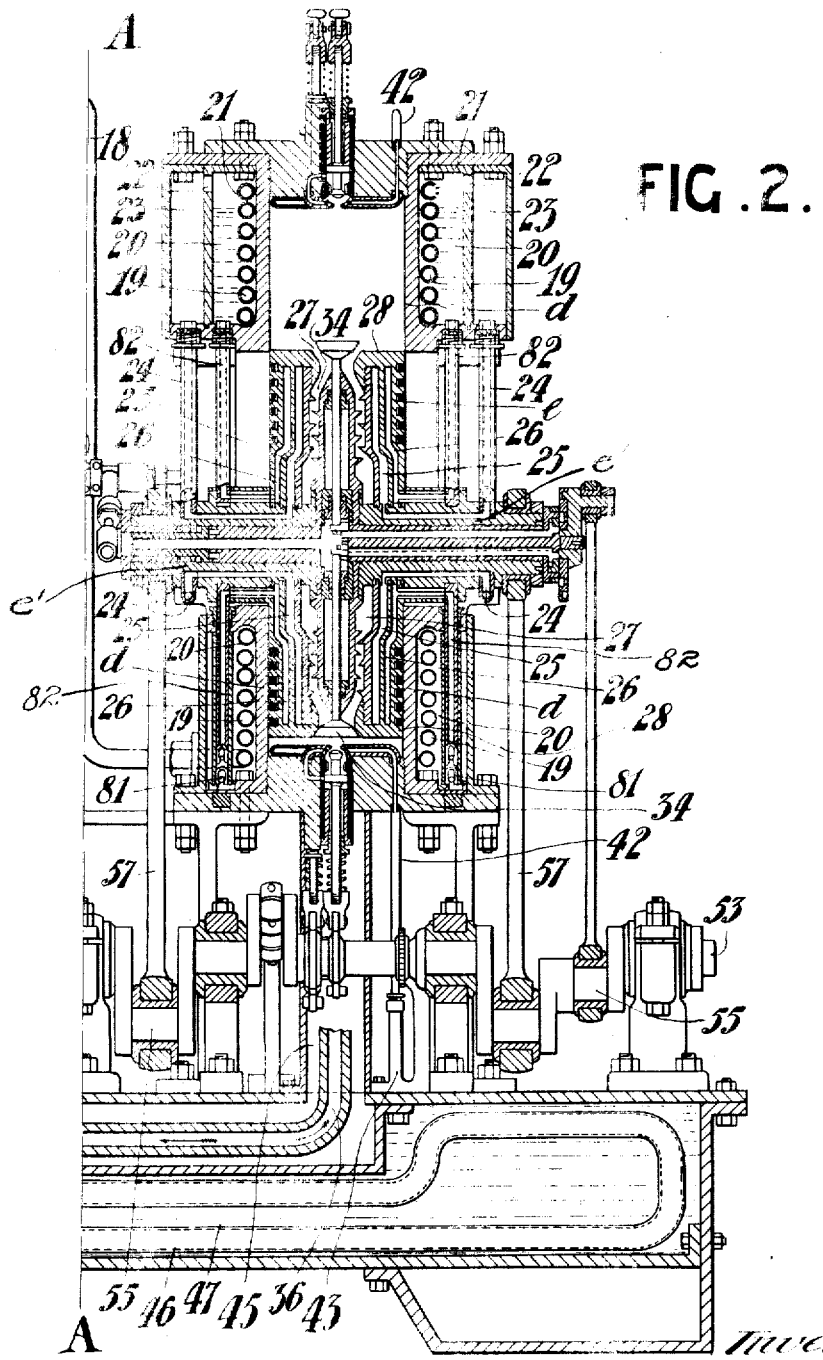

In the drawings—Figure 1 represents a central vertical section of the left-hand portion of an engine constructed in accordance with the present invention; Fig. 2 is a view similar to Fig. 1 showing the right-hand portion of the engine; Fig. 3 represents a section taken at right angles to the sections shown in Figs. 1 and 2; Figs. 4 and 4ª together constitute a plan view of the engine shown in the preceding figures, the turbine and its fluid supply passages being shown in section; Fig. 5 is a detail view with parts in section showing the turbine or auxiliary motor. Fig. 6 represents a transverse section of the piston of the internal combustion engine, illustrating the radial ducts which connect the fluid chamber 25 with the central passage 29 of the piston.

Similar parts are designated by the same numerals of reference in the several figures.

The engine shown in the present embodiment of my invention, comprises a suitable base which is preferably formed hollow to provide a water tank that will be hereinafter more fully described, the upper side of the tank being provided with bearings for the main shaft 53, and brackets or other devices for supporting the engine and compressor cylinders, and it also provides means for supporting a shaft $h$ for the auxiliary motor, the latter being operatively connected to the main engine shaft by means of gearing of a suitable ratio that will permit the main engine and the auxiliary motor to operate at the proper relative speeds.

In the present instance, a vertically arranged internal combustion engine is connected to the right-hand end of the main engine shaft, and an air compressor is connected to the said shaft at the left-hand side of the internal combustion engine, as shown in Figs. 1 and 2, a turbine constituting the auxiliary motor and having a runner or revoluble element which is fixed to revolve on the shaft $h$. The internal combustion engine comprises a cylinder $d$ having combustion chambers formed at the opposite ends thereof, a piston $e$ being arranged to operate vertically within the cylinder and having piston heads on the opposite ends thereof. Any suitable valve mechanism may be employed for controlling the admission of fuel or hydro-carbon to the combustion chamber of the cylinder and for permitting it to exhaust therefrom after the explosions, the piston being provided in the present instance with a pair of axially arranged exhaust passages 27 entering at the opposite ends thereof and controlled by exhaust valves 34 which may be operated in any suitable way, those shown in the present instance being operated in a manner similar to that described in the prior application aforesaid, the exhaust gases from the axial passages 27 passing through a duct 45 at each end thereof into a chamber 44 which is formed at one side of the casing of the cylinder and passes through a conduit 45ª, the latter discharging into a cooling coil 46 which is submerged in the liquid tank 47 and finally discharges at 48, the heat contained in the products of combustion being absorbed by the water within the tank for a purpose to be presently described.

The admission of combustible gas and air to the cylinder may also be controlled by a valve mechanism of any suitable construction, a pair of valves 60 being employed in the present instance from which the mixed gas and air is discharged through the openings 61, which valves are constructed substantially in the same manner as those described in my prior application aforesaid. These valves are operated by a cam 73 arranged on the main engine shaft 53 and coöperating with rollers or projections 72, one of which is directly connected to the lower valve, and the other is arranged on a lever 71 which is connected to operate a bell crank lever 69 by means of a rod 70, the bell crank being arranged at the upper end of the cylinder and coöperating with the upper valve. The piston is provided with a pair of oppositely extending trunnions $e'$ which project through openings in the opposite walls of the cylinder and are connected to cranks 55 of the engine shaft by means of a pair of connecting rods 57.

The upper and lower portions of the cylinder are surrounded by heat absorbing chambers 20, and those portions of the cylinder within these chambers are surrounded by coils 19, the upper and lower coils being connected by vertical pipes 19ª, as shown in Fig. 3, and the upper convolution of the top coil is provided with numerous orifices 21 through which the fluid contained in the coils is discharged into the chamber 20, as shown in Fig. 2. This chamber 20 surrounding the upper and lower portions of the cylinder is adapted to contain liquid which is conducted thereto by the vertical passage 20ª, shown in Fig. 3, and liquid is conducted from the lower chamber 20 into a water chamber 26 in the engine piston by means of a pair of reciprocatory tubes 82 which are carried by the trunnions of the piston, the lower ends of these tubes being provided with valves 81 which control the liquid so as to insure a circulation thereof. The upper chamber 20 communicates with the water chamber 26 of the piston by means of a similar pair of reciprocatory tubes 82 which have stuffing box connections with the casing about the cylinder casing and operate longitudinally during the movements of the piston. The piston is also provided with a chamber 25 for the passage of the turbine motive fluid, the latter being supplied thereto by means of a pair of reciprocating tubes 24, the ends of which open into a pair of outer chambers 23 which are located exterior to the upper liquid chamber 20, communication between these two chambers being established by the passages 22. This fluid chamber 25 in the piston communicates with a central passage 29 by means of a set of radial ducts 29ª, as shown in Fig. 6, and fluid is conducted from this central chamber by means of the passages 30 which discharge into a passage 35 formed in a radially extending arm 35ª which extends through an opening in one of the walls of the cylinder and projects into the exhaust chamber 44, the said arm being provided with a telescopically mounted tube 135 which discharges into a fluid conducting pipe 36 which is inclosed within the exhaust conduit 45ª and discharges at 36ª into the turbine nozzles. The chamber 20 is separated from the outer chambers 23 for the turbine motive fluid by partitions or septums, the intercommunicating passages 22 being formed therein at a point above the level of the liquid in the chamber 20, and consequently the liquid cannot enter these outer chambers from which the turbine motive fluid is supplied to the fluid chambers in the piston, as shown in Fig. 2.

The compressor which supplies the motive fluid to the heating chambers of the engine, embodies generally a cylinder $b$ having compression chambers formed at the opposite ends thereof and is provided with a vertically reciprocating piston having a pair of heads $c$ which operate in the respective compression chambers, suitable inlet and outlet valves 5 and 6 being provided for each compression chamber. Air is supplied to the inlet valves 5 by means of suitable piping 3 which leads from a chamber 2 within which low and high pressure tanks or reservoirs $a$ and $g$ are located, a shell or casing 2ª serving to inclose the parts, air from the atmosphere being admitted to the chamber 2 by the openings 1 which are formed in the casing, as shown in Figs. 3 and 4ª, and the compressed fluid is discharged from the outlet valves 6 into pipes 4, as shown in Fig. 1, these pipes leading to the low pressure tank $a$, as shown in Figs. 3 and 4. Any suitable means may be employed for actuating the inlet and discharge valves, a pair of cams 105 and 106 being provided for this purpose in the present instance which are mounted on the main engine shaft and which coöperate with rollers or projections 107 and 108, respectively, the latter being directly connected with the lower inlet and discharge valves, and the upper inlet and discharge valves are also operated by these cams by means of the levers 109 and 110 having rollers 111 and 112 to engage the cams and are connected by links 113 and 114 to a pair of bell crank levers 115 and 116 mounted on the upper end of the compressor cylinder, as shown in Figs. 1, 4 and 4ª.

The piston of the compressor is provided with a pair of trunnions 10 having fluid passages 9 therein which are supplied with fluid by means of a pair of telescopic connections 8, the latter in turn receiving fluid from the pipes 7 which receive fluid from the low pressure tank $a$ through the connecting member 7ª and the pipe 62, as shown in Figs. 4 and 4ª. The passages 9 deliver the motive fluid into the axial passages 11 in the compressor piston, and the latter in turn discharge through the openings 12 and 13 in the opposite ends of the piston into an annular chamber 14 therein, and the fluid is discharged from this annular chamber by means of a pair of inlet and outlet tubes 16 which open into an annular heat absorbing chamber 17 which surrounds the compression chambers of the cylinder, these tubes being provided with stuffing box connections with the cylinder casing in order that they may reciprocate according to the movements of the piston without leakage of fluid, and their upper ends open into vertically extended chambers 18ª with which a fluid discharge pipe 18 communicates, the arrangement just described insuring the necessary movements of the tubes without submerging their open ends below the level of the liquid. The discharge pipe 18 leads from the chambers 18ª to the coil 19 which is arranged within the chambers 20 surrounding the cylinder of the internal combustion engine, as previously described.

The liquid within the chambers 20 surrounding the cylinders of the engine and the chambers 17 of the compressor, is maintained at a given level preferably by means of a suitable valve mechanism, that shown in Fig. 3 being composed of a float 79 which is arranged to operate within a chamber 75 communicating with the chambers 20 of the engine by means of upper and lower passages 75ª and 75ᵇ, the float being operatively connected to a pair of liquid and air controlling valves 78 and 80, both communicating with a liquid supply tank 74, the latter being supplied with liquid from a suitable source by means of a pipe 76 which is controlled by a valve 77, falling of the liquid within the chamber 75 causing the float to simultaneously open the air and liquid valves, the outlet of the air valve discharging into the supply tank 74 and forcing liquid therefrom through the valve 78, thereby maintaining the liquid automatically at a predetermined level.

Fuel is supplied to the valve 60 of the engine by means of the pipes 42 which are fed by a pump 43 and air under high pressure is also supplied to the said valves from the high pressure tank $g$ by means of the pipes 59, as shown in Fig. 3, and air is supplied to the combustion chambers of the engine after the explosions therein by means of pipes 62 which lead preferably from the low pressure tank $a$. Fluid under high pressure is supplied to the tank $g$ by means of a pump, as shown in Fig. 3, being composed of a suitable cylinder having a plunger 50 which is operated by a crank 52 on the engine shaft provided with a connecting rod 51, and air is supplied to the pump preferably from the low pressure tank $a$ by means of a pipe 49 through an inlet valve 64, and the discharge of high pressure air from the pump is controlled by a valve 65 which delivers into a pipe 58 leading to the high pressure tank. A safety valve 66 is preferably provided on the high pressure tank for relieving excessive pressure therein, the fluid relieved by the safety valve being conducted by a passage 66ª into the low pressure tank $a$, and the latter is also provided with a similar relief valve 67, all as shown in Fig. 3, and described more fully in my prior application aforesaid.

Any suitable form of motor may be employed as an auxiliary to the main engine and for the purpose of utilizing the heat energy developed during the operation of the latter, a turbine being usually preferable, the runner or revoluble element $f$ of which is mounted on a shaft $h$ which in turn is connected to the engine shaft by means of a pinion and gear 150 and 151, respectively, the ratio of gearing being such as to insure proper relative speeds of the main and auxiliary motors to enable them to operate efficiently. The periphery of the runner is provided with vanes or buckets 38 into which the motive fluid is discharged from nozzles controlled by the two sets of valves 85 and 86, as shown in Fig. 5, the nozzles of each set being directed in reverse directions in order that the turbine may revolve in either direction, and these inlet valves are supplied with fluid by the annular passages 37 which communicate with the fluid supply passage 36, as shown in Fig. 4. The fluid is exhausted from the runner into annular chambers 39 which surround the turbine casing, and these exhaust chambers discharge into an outlet 40 which enters the lower portion of the chamber 2.

In order to condense the moisture contained in the fluid discharged from the turbine, the lower portion of this chamber 2 is provided with a condensing medium 83 which may be composed of a perforated metal structure which will present a relatively large area to the exhausting fluid.

In practice, air is supplied to the compressor through the openings 1 formed in the casing 2ª which surrounds the high and low pressure reservoirs and forms the condensing or refrigerating chamber for the gases exhausting from the turbine, the air entering the inlet valves 5 by way of the supply pipe 3, and discharging from the compressor through the outlet valves 6 into the discharge pipes 4, the latter leading to the low pressure tank $a$, and the fluid is returned from the low pressure reservoir to the heat absorbing chambers of the compressor by means of the pipes 7 which lead to the telescopic connections 8, and from the latter the air is discharged into the passages 9, thence into the nozzle passages 11, through the openings 12 and 13 and into the annular chamber 14 of the compressor piston. From the latter it is conducted by the reciprocatory tubes 16 into the air space 17 above the liquid which surrounds the compressor cylinder. From the latter the fluid is conducted by means of the chambers 18ᵃ, and discharge pipe 18 into the coil 19 surrounding the cylinder, of the internal combustion engine, as shown in Fig. 2, the fluid first entering the lower portion of the coil and then passing through the vertical portions 19ᵃ thereof into the upper portion of the coil, and finally discharging into the space above the liquid into the chamber 20 through the orifices 21, the fluid thence passing into the intercommunicating passages 22 into the outer chambers 23, and from the latter into the upper open ends of the reciprocatory tubes 24, the latter serving to conduct the fluid into the annular air chamber 25 of the engine piston, and the air thence passes into the central passage 29, it being conducted from the latter by the conduits 30 and 31 and passage 35 into the conduit 36 (see Fig. 3), and from the latter it is discharged into annular supply passage 37 of the turbine casing. From the latter it is discharged against the vanes of the runner of the turbine, and is exhausted into the channels 39 which in turn deliver into the passage 40, and from this passage the fluid is discharged through the condensing medium 83 located in the refrigerating chamber in the lower portion of the chamber 2.

The highly heated exhaust gases from the engine are discharged into the chamber 44, as shown in Fig. 3 and from the latter they are conducted through the conduit 45ᵃ into the cooling coil 46 which is submerged in the liquid contained in the tank 47, the exhaust gases being finally discharged at 48. The heat of the exhaust gases is absorbed by the liquid in the tank 47, and the heat molecules in the water are conducted by the vertical passages 20ᵃ to the liquid chamber 20 surrounding the cylinder of the engine and the encircling soil 19, causing vapor to be given off from the liquid in the form of steam which is absorbed by the motive fluid which is conveyed above the surface of the water or liquid. The motive fluid thus charged with steam or vapor, is conducted through the conduit 36, and as the latter is surrounded by the exhaust gases discharging through the conduit 45ᵃ, it will be superheated, and thereby expanded considerably in volume before it is received by the turbine.

It is generally preferable to provide a brake mechanism for stopping the engine when the fluid supplied to the turbine is interrupted, the turbine shaft h being provided with brake drums 92 in the present instance having brake bands 91 which cooperate therewith, and the brake bands are each operated by a fluid pressure motor, those shown in the present instance each comprising a cylinder having a piston mounted to operate therein and connected to one end of the brake band, the fluid being admitted to one side of the piston to set the brake by a valve 90 and to the opposite side of the piston to release the brake by a reverse movement of the said valve, and this valve is provided with an operating arm 89 having a projection thereon to coöperate with a transverse guide 88, the latter being carried by a link 87 which is connected to the sets of fluid controlling valves 85 and 86, the valves being connected for simultaneous movement and they are all operated by a lever 84, movement of the latter in one direction about its axis causing the valves 85 to open, and the valves 86 to simultaneously close, the valve 90 of the brake cylinder at this time being in a position to interrupt flow of fluid to either side of the piston, and conversely a movement of the operating lever in the opposite direction will close the valves 85 and open the valves 86, the valve 90 in this case being also in closed position. While the operating lever is in neutral position, as shown in Fig. 5, the valve 90 of the brake cylinder will admit fluid to the piston and cause the brake to be set, and when the operating lever is moved in either direction from the neutral position, fluid will be admitted to the opposite side of the piston and cause the brake to be released.

An engine constructed in accordance with the present invention is capable of operating with a relatively high efficiency, for the reason that the heat developed during the operation of the internal combustion engine is utilized to expand the motive fluid for the turbine or the auxiliary motor, and the latter may be employed in starting the main engine or motor, and in the present instance it is so connected thereto as to serve as a fly-wheel therefor.

What I claim is:—

1. The combination with a tank providing a source of liquid supply, of an engine embodying a cylinder having a chamber surrounding it and adapted to receive liquid from the tank, said liquid chamber having a vapor collecting chamber communicating with its upper portion, a piston mounted to reciprocate in the cylinder and having a fluid receiving chamber therein, means for conducting a supply of liquid from said first mentioned chamber to said chamber within said piston including a tube communicating with the fluid receiving chamber in the piston and having an open end discharging into the liquid chamber of the cylinder.

2. In an engine of the character described, the combination with a cylinder having a pair of liquid chambers surrounding the opposite ends thereof, of a piston mounted to operate within the cylinder and provided with a fluid receiving chamber, and a pair of oppositely directed tubes carried by the piston and communicating with the fluid receiving chamber therein, and having their ends mounted to reciprocate within the liquid chambers of the cylinder, and a non-return valve in one of the tubes.

3. In an engine of the character described, the combination with a cylinder having a liquid chamber surrounding it, a vapor collecting chamber communicating with the upper portion of the liquid chamber and of a piston mounted to reciprocate in the cylinder and having a fluid chamber or passage therein, and a pair of reciprocating tubes movable with the piston and communicating with the fluid chamber therein, the ends of the tubes discharging into the liquid chamber surrounding the cylinder, and a valve carried by one of the tubes for creating a positive flow of fluid from said surrounding fluid chamber into the fluid chamber of the piston.

4. In an engine of the character described, the combination with a vertically arranged cylinder having a pair of liquid chambers surrounding its upper and lower ends, of a piston mounted to reciprocate within the cylinder and having a fluid chamber therein, pairs of upwardly and downwardly extending tubes carried by the piston and having their ends opening into the respective chambers surrounding the cylinder, said tubes serving respectively as fluid supply and discharge passages for the fluid chamber within the piston and valves carried by certain of the tubes for creating a positive flow of fluid therethrough during the reciprocatory movements of the piston.

5. In an engine of the character described, the combination with a vertically arranged cylinder having upper and lower liquid chambers surrounding it, and means for maintaining liquid at a predetermined level in the upper chamber, and fluid chambers arranged adjacent to one of the liquid chambers and communicating therewith at points above the level of the liquid contained therein, of a piston mounted to operate in the cylinder and having a fluid chamber therein, means for conducting fluid from the fluid chambers of the cylinder to that of the piston, and means for conducting fluid from the chamber of the latter to a fluid pressure motor.

6. In an engine of the character described, the combination with a cylinder having upper and lower liquid chambers, upper and lower coils arranged within the said chambers, the lower coil communicating with a source of fluid pressure supply, and the upper coil being provided with discharge orifices, and fluid chambers arranged adjacent to the upper liquid chamber and communicating with the latter at points above the level of the liquid therein, of a piston mounted to operate in the cylinder and having a fluid chamber therein, means for conducting fluid from the fluid chambers of the cylinder to that of the piston, a fluid pressure motor, and means for conducting the fluid from the fluid chamber of the piston to the said motor.

7. In an engine of the character described, the combination with a tank, a vertically arranged cylinder having upper and lower liquid chambers communicating with the tank, means for maintaining the liquid at a predetermined level in the upper chamber, coils connected to one another and arranged within the respective liquid chambers, the lower coil being connected to a source of fluid pressure supply, and the upper coil being provided with discharge orifices arranged above the level of the liquid in the upper chamber, fluid chambers arranged adjacent to the upper liquid chamber and provided with passages which communicate with the liquid chamber at points above the level of the liquid therein, of a piston mounted to operate in the cylinder and provided with a fluid chamber, means for conducting fluid from the fluid chambers of the cylinder to that of the piston, a fluid pressure motor, and means for conducting fluid from the fluid chamber of the piston to the motor.

8. In an engine of the character described, the combination with a tank having a heating coil arranged therein, a vertically arranged cylinder having upper and lower liquid chambers communicating with one another and with the tank, and arranged above the latter, means for maintaining the liquid at a predetermined level in the upper liquid chamber to provide an air space, air conducting coils arranged in the upper and lower liquid chambers and communicating with one another, the lower coil being connected to a source of air supply, and the upper coil being provided with discharge orifices arranged in the air space of the upper liquid chamber, of a piston mounted to operate in the cylinder, means for conducting the exhaust from the cylinder through the heating coil in the tank, a fluid pressure motor, and means for conducting air from the space above the liquid in the upper chamber to the motor.

9. In an engine of the character described, the combination with a tank, of an air compressor having a vertically arranged cylinder provided with a surrounding liquid chamber, a piston mounted to reciprocate vertically in the cylinder and having fluid passages therein, means for supplying air under pressure to the passages of the piston, and reciprocatory tubes carried by the piston and having their upper ends discharging into the liquid chamber at points above the level of the liquid therein, of an internal combustion engine embodying a vertically arranged cylinder provided with a liquid chamber, a coil arranged in the said chamber and connected at its lower end to receive air from the upper portion of the liquid chamber of the compressor and provided with discharge orifices in its upper portion, means for maintaining liquid from the tank at a predetermined level in the liquid chambers of the compressor and engine cylinders, a fluid pressure motor, and means for conducting the air discharged from the coil to the motor.

In testimony whereof I have hereunto set my hand in presence of two subscribing witnesses.

JOHN HUTCHINGS.

Witnesses:
JOHN COODE WARE,
HARRY JOHN STOGDEN.